US006929329B2

(12) United States Patent
Kent et al.

(10) Patent No.: US 6,929,329 B2
(45) Date of Patent: Aug. 16, 2005

(54) DUMP TRAILER GATE FOR TRUCKS

(76) Inventors: Ronny L. Kent, Rt. 2, Box 1335, Lakeland, GA (US) 31635; Lynn Kent Solomon, Rt. 2, Box 1335, Lakeland, GA (US) 31635

( * ) Notice: Subject to any disclaimer, the term of this patent is extended or adjusted under 35 U.S.C. 154(b) by 0 days.

(21) Appl. No.: 10/792,243

(22) Filed: Mar. 3, 2004

(65) Prior Publication Data

US 2004/0174036 A1 Sep. 9, 2004

Related U.S. Application Data

(60) Provisional application No. 60/451,619, filed on Mar. 3, 2003.

(51) Int. Cl.[7] ................................................ B60P 1/26
(52) U.S. Cl. ........................................ 298/7; 298/23 R
(58) Field of Search .................. 298/23 R, 23 MD, 298/7, 23 D; 296/51, 56, 61, 57.1, 146.8

(56) References Cited

U.S. PATENT DOCUMENTS

| 1,360,772 | A | | 11/1920 | Mecking |
| 1,958,908 | A | | 5/1934 | Brumbaugh |
| 2,678,121 | A | * | 5/1954 | Phillips |
| 2,742,317 | A | | 4/1956 | Chandler |
| 3,361,476 | A | * | 1/1968 | Smock ........................ 298/7 |
| 4,067,466 | A | * | 1/1978 | Parks et al. |
| 4,989,918 | A | | 2/1991 | Biddy |
| 5,288,137 | A | | 2/1994 | Henry |
| 5,407,251 | A | | 4/1995 | Ritchie, II et al. |
| 5,823,630 | A | | 10/1998 | Graham |
| 5,855,466 | A | | 1/1999 | Faulkner et al. |
| 5,890,770 | A | | 4/1999 | Pamberg, Jr. |
| 5,934,731 | A | | 8/1999 | Routledge |
| 6,186,731 | B1 | * | 2/2001 | Vickers et al. |
| 6,189,976 | B1 | | 2/2001 | Lawson |
| 6,217,123 | B1 | | 4/2001 | Palmberg, Jr. |
| 6,302,491 | B1 | * | 10/2001 | Anderson ................. 298/23 S |
| 6,386,818 | B1 | | 5/2002 | Reed |
| 6,491,349 | B2 | * | 12/2002 | McCafferty et al. .... 298/23 DF |
| 6,499,808 | B2 | | 12/2002 | Palmberg, Jr. |

* cited by examiner

*Primary Examiner*—Stephen Gordon
(74) *Attorney, Agent, or Firm*—Brian D. Bellamy

(57) ABSTRACT

A dump trailer gate for trucks having a gate door movably positioned within a dump door opening of a dump door. A first lever is securely attached to the gate door extending downwardly therefrom. When a front end of a scoop of a bucket loader applies pressure onto the first lever, the gate door opens and contents of the dump truck spill into the scoop. A second lever is securely attached to an opposite side of the gate door extending outwardly therefrom. At least one biasing spring is attached at a bottom distal end to the second lever and attached at a top distal end to the dump door. When pressure is released from the first lever, the gate door automatically closes.

14 Claims, 4 Drawing Sheets

DUMP TRAILER GATE FOR TRUCKS

PRIORITY CLAIM

Applicant claims the priority of U.S. Provisional Application No. 60/451,619 filed Mar. 3, 2003.

BACKGROUND OF THE INVENTION

1. Field of the Invention

The present invention relates to a dump trailer gate. More particularly, the present invention relates to a dump trailer gate that opens downwardly when a bucket loader applies pressure to an arm connected to the gate.

2. Description of the Prior Art

Numerous innovations for a dump trailer gate for trucks have been provided in the prior art described below. Even though these innovations may be suitable for the specific individual purposes to which they address, the prior art innovations differ from the present invention as hereinafter contrasted.

In U.S. Pat. No. 5,823,630, invented by Graham, titled, Pivot lip dump gate, a pivot lip dump gate for the dump body of a dump truck, trailer or the like comprises a split gate including a large upper hinged gate portion and a hinged lower gate or lip which serves the double function of guiding contents rearwardly from the dump body in its lowered dumping position and for closing the rearward end of the dump body in its raised transport position while also serving to lock the swinging upper gate in its closed transport position.

In U.S. Pat. No. 4,989,918, invented by Biddy, titled, Material handling vehicle with improved tailgate, a material handling vehicle is disclosed which includes a substantially rectangular material container with an open rear end. The container is pivotably mounted to the vehicle frame so that the front end of the container can be lifted to cause material in the container to be discharged through the open rear end. A tailgate is mounted to the open rear end of the container and can be selectively moved between a closed position where the tailgate overlies and closes the open rear end of the container, a partially raised position to permit metering of a material there through, and a fully raised position where the tailgate is free to swing outwardly about a pivotal axis. A pair of hydraulically actuated lifting members selectively move the tailgate between the three positions.

In U.S. Pat. No. 6,499,808, invented by Palmberg, Jr., titled, Dump vehicle with a positively controlled opening gate, a dump vehicle with a positively controlled opening gate is disclosed. The vehicle includes a frame, a dump bed mounted on the frame and having a floor, front and side walls and a rear opening through which material can be discharged from the bed, and a gate having a pair of lateral edges and a lower edge. The gate is pivotally mounted adjacent the rear opening and has a closed position in which the gate blocks the rear opening to prevent discharge from the bed through the rear opening. The vehicle further includes a gate control mechanism connected to the gate. The gate control mechanism is adapted to selectively raise the gate from the closed position to allow metered discharge of material or to release the gate from the closed position so that the gate may pivot away from the rear opening to allow unmetered discharge of material.

In U.S. Pat. No. 6,386,818, invented by Reed, titled, Live bottom trailer effectively having extendible rear end via outward pivoting doors, a live bottom trailer or vehicle having horizontally outwardly pivoting doors as the tailgate is disclosed. The live bottom trailer includes a hopper having an opening top with sidewalls converging towards an endless conveyor. The endless conveyor is operable to mobilize material in the hopper rearwardly toward the rear discharge area of the trailer. A pair of doors are hinged to the hopper sidewalls and pivot outwardly away from each other. The doors can be positioned in a rearward projecting manner such that they direct material more deeply into an asphalt paver. The doors are independently controlled by pneumatic or hydraulic cylinders to allow the material to be directed left or right. The mechanical linkage which connects the cylinders to the doors has an over center position such that the doors stay locked even if pressure in the cylinders is lost when material in the hopper is exerting rearward force on the doors of the hopper.

In U.S. Pat. No. 6,217,123, invented by Palmberg, Jr., titled, Dump vehicle with a positively controlled opening gate, a dump vehicle with a positively controlled opening gate is disclosed. The vehicle includes a frame, a dump bed mounted on the frame and having a floor, front and side walls and a rear opening through which material can be discharged from the bed, and a gate having a pair of lateral edges and a lower edge. The gate is pivotally mounted adjacent the rear opening and has a closed position in which the gate blocks the rear opening to prevent discharge from the bed through the rear opening. The vehicle further includes a gate control mechanism connected to the gate. The gate control mechanism is adapted to selectively raise the gate from the closed position to allow metered discharge of material or to release the gate from the closed position so that the gate may pivot away from the rear opening to allow unmetered discharge of material.

U.S. Pat. No. 6,189,976, invented by Lawson, titled, Spreader pan for a gravity discharge trailer box discloses a laterally extending spreader pan having a short longitudinal dimension of about six inches, pivotally mounted on a lateral shaft secured to a trailer or truck box adjacent to the rear edge of the box floor. The spreader pan is pivotal between an operating position where the pan is substantially co-planar with the floor of the truck or trailer box and a non-operating position where the spreader pan is pivoted downward to a position that is substantially normal to the box floor and which does not extend beyond the rear edge of the truck or trailer box. An operating lever is provided on the lateral shaft with the free end of the lever connected to the plunger of a pneumatic cylinder controlled from the cab of the truck. When the plunger is extended the shaft and spreader pan is rotated or pivoted upwardly into its operating position, co-planar with the floor of the box. When the plunger is retracted the shaft and spreader pan is rotated downwardly into its out of the way, non-operating position.

In U.S. Pat. No. 5,890,770, invented by Palmberg, Jr., titled, Dump vehicle with a positively controlled opening gate, a dump vehicle with a positively controlled opening gate is disclosed. The vehicle includes a frame, a dump bed mounted on the frame and having a floor, front and side walls and a rear opening through which material can be discharged from the bed, and a gate having a pair of lateral edges and a lower edge. The gate is pivotally mounted adjacent the rear opening and has a closed position in which the gate blocks the rear opening to prevent discharge from the bed through the rear opening. The vehicle further includes a gate control mechanism connected to the gate. The gate control mechanism is adapted to selectively raise the gate from the closed position to allow metered discharge of material or to release the gate from the closed position so that the gate may pivot away from the rear opening to allow unmetered discharge of material.

U.S. Pat. No. 5,855,466, invented by Faulkner, et al., titled, Vehicle discharge system discloses a vehicle discharge system for a vehicle. The vehicle discharge system is provided with a rearwardly tippable bed that includes a tailgate constituted by a housing mounted at the rear of the bed adjacent to the tailgate, a discharge auger rotatably supported within the housing and arranged to receive material which passes the tailgate when the bed is tipped, an auger drive to drive the auger and discharge material carried within the vehicle bed to the side of the vehicle as the bed is tipped, and a flow control structure capable of differentially exposing material held within the vehicle bed to the discharge auger. The flow control structure is constituted by a flow control gate which is capable of being moved in a plane substantially perpendicular to the plane of the base of the vehicle bed and tilted to form a tapered and adjustable opening which exposes material within the vehicle bed to the auger as the bed is tipped. The nature of an auger is to preferentially pick up material from one end remote from that at which material is discharged and so the flow control gate is tilted to expose less of the auger to the material at that end. The combination of varying the opening height and degree of tilt of the flow control gate ensures that material is discharged evenly and controllably across the width of the vehicle bed.

In U.S. Pat. No. 5,407,251, invented by, Ritchie, II, et al., titled, Dump truck tailgate, a tailgate assembly is disclosed for use with a dump truck. The tailgate assembly includes a bed, two side walls and a bed opening, and also has an obstruction, such as a tag wheel assembly, spaced relatively closely to the bed opening. The assembly comprises a tailgate pivotally connected to hydraulically operated arms for moving the tailgate between open and closed positions. Guides restrict the tailgate to a first substantially rectilinear path of travel and lost-motion connections prevent relative pivoting of the tailgate with respect to the arms to cause outward swinging of the tailgate with respect to the truck bed during a second path of movement to prevent interference between the tailgate and the obstruction during sequential opening of the bed and the raising of the bed to its dumping position.

In U.S. Pat. No. 5,288,137, invented by, Henry, entitled, End gate, an end gate is provided for a truck box which may be selectively automatically and pivotally moved to an open position as the truck box is pivotally moved to its dumping position. A cable interconnecting the end gate and dump box is threaded through a series of pulleys to cause the end gate to pivot outwardly in response to upwardly movement of the dump box.

The aforementioned patents differ from the present invention because they lack one or more features described and claimed in the present invention: a bottom hinged gate attached to a first lever extending downwardly on one side and a second lever on the opposite side. The second lever is connected to a biasing means functioning to return the gate into a closed position.

Numerous innovations for a dump trailer gate for trucks have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a dump trailer gate that opens downwardly when a bucket loader applies controlled pressure to an arm connected to the gate, which allows the gate to open spilling gravel into a bucket loader scoop. The gate is automatically closed by a biasing means when the bucket loader ceases to apply pressure to the extended arm.

The types of problems encountered in the prior art are dump gates open by either work via hydraulic means or by raising the dump upwardly to allow the gravel to fill the bucket loader. This process requires at least two persons for operation. The present invention requires only one person since the same person can raise the dump and thereafter utilize the bucket loader to open the gate.

In the prior art, unsuccessful attempts to solve this problem were attempted, namely: self actuating or hydraulic opening gates. However, the problem was solved by the present invention because the present invention allows the bucket loader operator to open the gate in a controlled means when the applying pressure thereto.

Innovations within the prior art are rapidly being exploited in the field of simplifying construction and reducing man power required to perform certain jobs.

The present invention went contrary to the teaching of the art which describes and claims hydraulic actuated or left pressure actuated gates.

The present invention solved a long felt need for a self actuating dump gate.

Accordingly, it is an object of the present invention to provide a dump trailer gate for trucks having a gate, first lever, biasing means, bracket, second lever, and arm.

More particularly, it is an object of the present invention to provide the gate having a gate rear panel, gate first side, and gate second side.

In keeping with these objects, and with others which will become apparent hereinafter, one feature of the present invention resides, briefly stated, in the gate first side having a gate first side crest appendage, gate first side outer support, gate first side panel, and gate first side shaft.

When the gate second side is designed in accordance with the present invention, it has a gate second side panel and a gate second side shaft.

In accordance with another feature of the present invention, the lever has a lever bottom, lever top, lever middle, and biasing means.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—dump trailer gate for trucks (10)
12—gate (12)
12A—gate door (12A)
12AA—gate top cross member (12AA)
12AR—gate right cross member (12AR)
12AL—gate left cross member (12AL)
12AC—gate center cross member (12AC)
12AB—gate bottom cross member (12AB)
12B—gate first side (12B)
12BA—gate first side crest appendage (12BA)
12BB—gate first side outer support (12BB)
12BC—gate first side panel (12BC)

12BD—gate first side shaft (12BD)
12C—gate second side (12C)
12CA—gate second side panel (12CA)
12CB—gate second side shaft (12CB)
14—lever (14)
14A—lever bottom (14A)
14B—lever top (14B)
14C—lever middle (14C)
16—biasing means (16)
18—bracket (18)
20—dump (20)
20A—dump gate (20A)
20AA—dump gate opening (20AA)
22—bucket loader (22)
22A—bucket loader scoop (22A)
22AA—bucket loader scoop front (22AA)
24—gravel (24)
26—second lever (26)

DESCRIPTION OF THE PREFERRED EMBODIMENT

Figure 1:
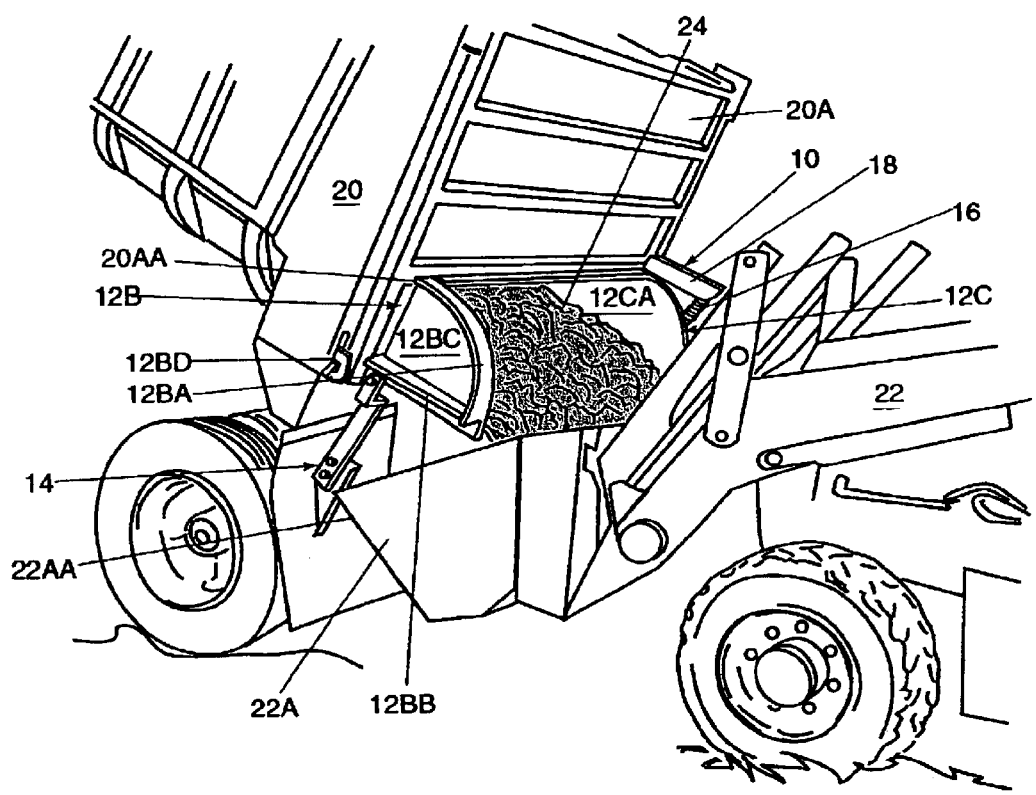
FIG. 1 is a left side rear perspective view of a dump trailer gate for trucks being opened by a pressure exerted from a bucket loader scoop front of a bucket loader.

Referring to FIG. 1 which is a left side view of a dump trailer gate for trucks (10) being opened by pressure exerted from a bucket loader scoop front (22AA) of a bucket loader (22) onto a downwardly positioned lever (14). A gate (12) comprises a gate door (12A) movably positioned within a dump door opening (20AA) of a dump door (20A). The gate (12) comprises a gate first side (12B) securely attached along an inner edge to a first side of the dump door opening (20AA). The gate (12) further comprises a gate second side (12C) securely attached along an inner edge to an opposite side of the dump door opening (20AA). The dump door (20A) is movably positioned between the gate second side (12C) and the gate first side (12B). The gate first side (12B) further comprises a gate first side shaft (12BD) securely attached to a left bottom corner of the dump door (20A) and positioned through an opening in the gate first side (12B) extending therefrom. The gate second side (12C) further comprises a gate second side shaft (12CB) securely attached to a right bottom corner of the dump door (20A) and positioned through an opening in the gate second side (12C) extending therefrom.

The gate first side (12B) preferably comprises a quarter circular shaped gate first side panel (12BC). The quarter circular shaped gate first side panel (12BC) preferably comprises a gate first side crest appendage (12BA) securely attached along a first edge extending outwardly therefrom. The quarter circular shaped gate first side panel (12BC) preferably further comprises a gate first side outer support (12BB) securely attached along a second edge extending outwardly therefrom. The gate first side crest appendage (12BA) and the gate first side outer support (12BB) function as structural support when the gate door (12A) opened and closed during use.

The gate second side (12C) preferably comprises a quarter circular shaped gate second side panel (12CA). The gate first side (12B) and gate second side (12C) function as a guidance means whereby the contents of the dump (20) such as gravel (24), is channeled into the bucket loader scoop (22A).

Figure 2:
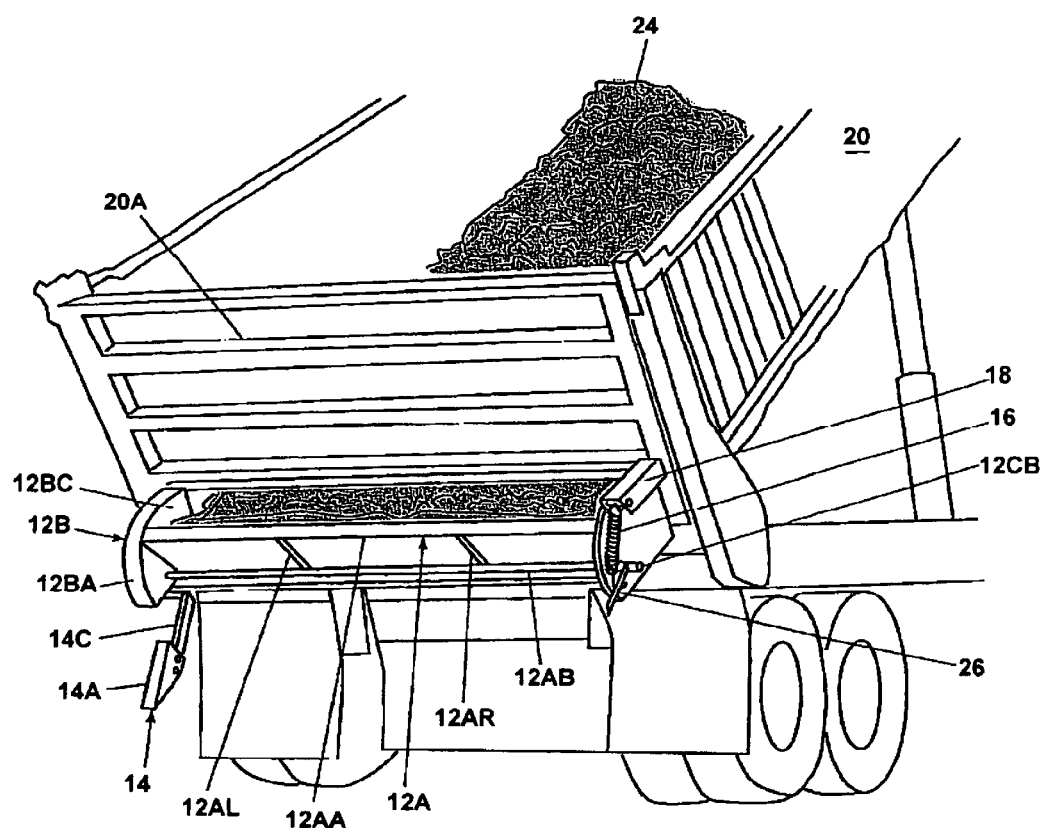
FIG. 2 is a left rear perspective view of a dump trailer gate for trucks in a semi opened position.
Figure 3:
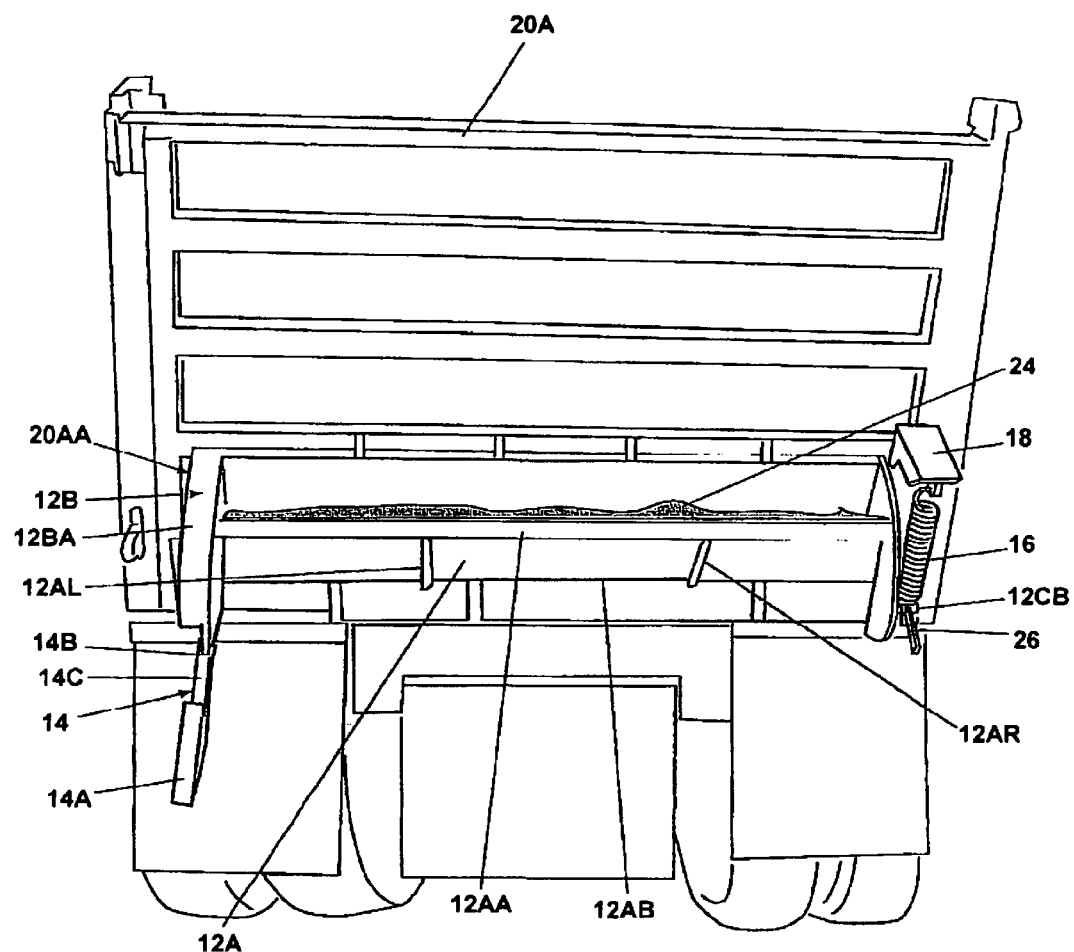
FIG. 3 is a rear perspective view of a dump trailer gate for trucks in a semi opened position.

Referring to FIG. 2 and FIG. 3 which are left and right rear perspective views of a dump trailer gate for trucks (10) in a semi opened position, respectively. A second lever (26) is securely attached to the gate second side shaft (12CB) extending outwardly therefrom. A biasing means (16) is attached at a bottom distal end to the second lever (26) and attached at a top distal end to the dump door (20A). When pressure is released from the lever (14), the biasing means (16) raises the gate door (12A) into a closed position.

The gate rear panel (12A) comprises at least one cross member securely attached to and positioned on an other surface thereof. The at least one cross member comprises a gate rear panel top cross member (12AA) securely positioned along an inner edge to a top edge of the gate rear panel (12A). The at least one cross member further comprises a gate rear panel bottom cross member (12AB) attached along a edge to a bottom edge of the gate rear panel (12A). The at least one cross member further comprises a gate rear panel right cross member (12AR) and a gate rear panel left cross member (12AL) securely attached to an outer surface of the gate rear panel (12A). The gate rear panel right cross member (12AR) and the gate rear panel left cross member (12AL) are securely attached at top distal ends to the gate rear panel top cross member (12AA) and securely attached at bottom distal ends to the gate rear panel bottom cross member (12AB).

The at least one cross member further comprises a gate rear panel center cross member (12AC) securely attached to an outer surface of the gate rear panel (12A). The gate rear panel center cross member (12AC) is securely attached at a left distal end to the gate rear panel left cross member (12AL) and securely attached at a right distal end to the gate rear panel center cross member (12AC). The cross members function as structural support for the gate door (12A) during unloading and pressure against the gate door (12A) during transportation of the contents within the dump (20).

The dump trailer gate for trucks (10) preferably comprises a bracket (18) securely fastened at an inner distal end to the dump door (20A). The biasing means (16) is attached at a top distal end to the bracket (18) and attached at a bottom distal end to the second lever (26). The bracket (18) functions to increase leverage enabling the biasing means (16) to exert additional upward pressure onto the second lever (26).

Figure 4:
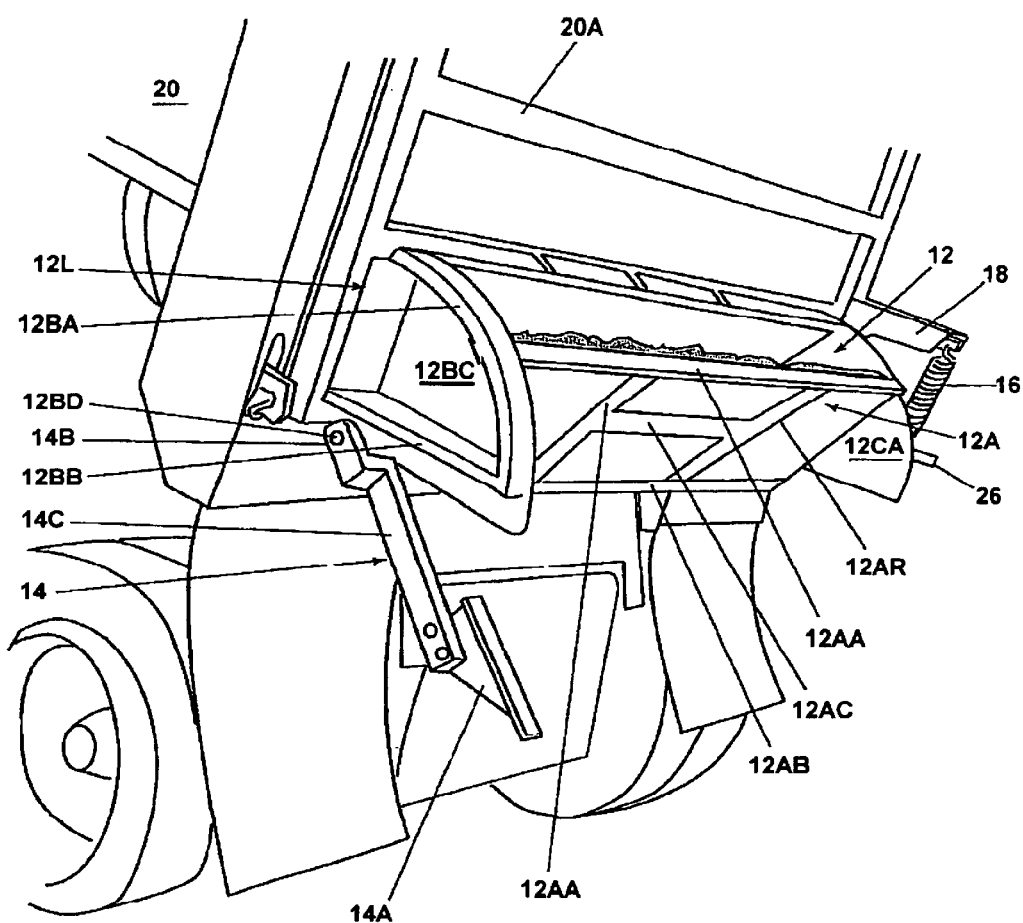
FIG. 4 is a right side rear perspective view of a dump trailer gate for trucks in a semi opened position.

Referring to FIG. 4 which is a right view of a dump trailer gate for trucks (10) in a semi opened position. The dump trailer gate for trucks (10) further comprises a first lever (14) securely attached to the gate first side shaft (12BD) extending downwardly therefrom. The first lever (14) further comprises a first lever bottom (14A) securely attached at a top end to a bottom end of a first lever middle (14C) securely attached at a top end to a bottom end of a first lever top (14B). The first lever bottom (14A) preferably has a wide surface area to facilitate contact with the bucket loader scoop front (22AA). The first lever top (14B) preferably comprises a L-Shaped configuration functioning to position the first lever (14) directly under the gate first side crest appendage (12BA). When the gate door (12A) is in a closed position, the first lever (14) rests against the gate first side crest appendage (12BA) as a stopping means.

It will be understood that each of the elements described above, or two or more together, may also find a useful application in other types of constructions differing from the type described above.

While the invention has been illustrated and described as embodied in a dump trailer gate for trucks, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the present invention that others can, by applying current knowledge, readily adapt it for various applications without omitting features that, from the standpoint of prior art, fairly constitute essential characteristics of the generic or specific aspects of this invention.

We claim:

1. A dump trailer gate for trucks comprising:
    A) a gate which comprises a gate door movably positioned within a dump door opening of a dump door, the gate comprises a gate first side securely attached along an inner edge to a first side of the dump door opening, the gate further comprises a gate second side securely attached along an inner edge to an opposite side of the dump door opening, the gate door is movably positioned between the gate second side and the gate first side, the gate first side further comprises a gate first side shaft securely attached to a first bottom corner of the dump door and positioned through an opening in the gate first side, the gate second side further comprises a gate second side shaft securely attached to an opposite bottom corner of the dump door and positioned through an opening in the gate second side;
    B) a first lever is securely attached to the gate first side shaft extending downwardly therefrom;
    C) a second lever is securely attached to the gate second side shaft extending outwardly therefrom; and
    D) at least one biasing means attached at a bottom distal end to the second lever and attached at a top distal end to the dump door.

2. The dump trailer gate for trucks as described in claim 1, wherein the gate door comprises a gate rear panel movably positioned within said dump door opening having at least one cross member securely attached to and positioned on an outer surface thereof.

3. The dump trailer gate for trucks as described in claim 2, wherein the at least one cross member comprises a gate rear panel top cross member securely positioned along an inner edge to a top edge of the gate rear panel.

4. The dump trailer gate for trucks as described in claim 3, wherein the at least one cross member further comprises a gate rear panel bottom cross member attached along a edge to a bottom edge of the gate rear panel.

5. The dump trailer gate for trucks as described in claim 4, wherein the at least one cross member further comprises a gate rear panel right cross member and a gate rear panel left cross member securely attached to the outer surface of the gate rear panel, the gate rear panel right cross member and the gate rear panel left cross member are securely attached at top distal ends to the gate rear panel top cross member and securely attached at bottom distal ends to the gate rear panel bottom cross member.

6. The dump trailer gate for trucks as described in claim 5, wherein the at least one cross member further comprises a gate rear panel center cross member securely attached to the outer surface of the gate rear panel, the gate rear panel center cross member is securely attached at a left distal end to the gate rear panel left cross member and securely attached at a right distal end to the gate rear panel right cross member.

7. The dump trailer gate for trucks as described in claim 1, wherein the gate first side comprises a quarter circular shaped gate first side panel.

8. The dump trailer gate for trucks as described in claim 7, wherein the quarter circular shaped gate first side panel comprises a gate first side crest appendage securely attached along a first edge of said gate first side panel and extending outwardly therefrom.

9. The dump trailer gate for trucks as described in claim 8, wherein the quarter circular shaped gate first side panel further comprises a gate first side outer support securely attached along a second edge of said gate first side panel and extending outwardly therefrom.

10. The dump trailer gate for trucks as described in claim 1, wherein the gate second side comprises a quarter circular shaped gate second side panel securely attached along a second edge of said second side and extending outwardly therefrom.

11. The dump trailer gate for trucks as described in claim 1, wherein the first lever further comprises a first lever bottom securely attached at a top end to a bottom end of a first lever middle securely attached at a top end to a bottom end of a first lever top.

12. The dump trailer gate for trucks as described in claim 11, wherein the first lever top comprises a L-Shaped configuration.

13. The dump trailer gate for trucks as described in claim 1, further comprises a bracket securely fastened at an inner distal end to the dump door, the biasing means is attached at a top distal end to the dump door via the bracket and attached at a bottom distal end to the second lever.

14. The dump trailer gate for trucks as described in claim 1, wherein the gate first side shaft and gate second side shaft are a single piece continuous shaft.

* * * * *